United States Patent
Markusch et al.

(10) Patent No.: US 6,602,025 B2
(45) Date of Patent: Aug. 5, 2003

(54) PROCESS FOR LINING CANALS, DITCHES AND PIPES WITH A NON-SAGGING POLYURETHANE/GEOFABRIC COMPOSITE

(75) Inventors: Peter H. Markusch, McMurray, PA (US); Ralf Guether, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/809,445

(22) Filed: Mar. 15, 2001

(65) Prior Publication Data

US 2002/0172561 A1 Nov. 21, 2002

(51) Int. Cl.⁷ ............. E16L 55/18; B32B 31/00; F16L 55/16
(52) U.S. Cl. ............. 405/184.2; 405/150.2; 405/184.1; 405/150.1; 138/145; 524/589; 524/590
(58) Field of Search ............. 138/145; 524/589, 524/590; 405/183.5, 184.2, 184.1, 154.1, 150.1, 150.2

(56) References Cited

U.S. PATENT DOCUMENTS

| | | | | |
|---|---|---|---|---|
| 4,009,063 A | * | 2/1977 | Wood | 138/141 |
| 4,064,211 A | * | 12/1977 | Wood | 138/140 |
| 4,310,373 A | * | 1/1982 | Schuhmacher et al. | 153/306.6 |
| 4,368,278 A | * | 1/1983 | Rasshofer et al. | 521/115 |
| 4,444,976 A | * | 4/1984 | Rabito | 528/60 |
| 4,521,465 A | * | 6/1985 | Schroer et al. | 427/333 |
| 4,552,934 A | * | 11/1985 | Rabito et al. | 524/451 |
| 4,576,205 A | * | 3/1986 | Morinaga et al. | 138/124 |
| 4,728,710 A | * | 3/1988 | Goel | 528/58 |
| 4,743,672 A | * | 5/1988 | Goel | 528/44 |
| 4,872,784 A | | 10/1989 | Payne | 405/270 |
| 4,955,759 A | | 9/1990 | Payne | 405/270 |
| 4,955,760 A | | 9/1990 | Payne | 405/270 |
| 4,994,540 A | * | 2/1991 | Boerner et al. | 521/137 |
| 5,049,006 A | | 9/1991 | Payne | 405/270 |
| 5,062,740 A | | 11/1991 | Payne | 405/270 |
| 5,166,303 A | * | 11/1992 | Markusch et al. | 528/26 |
| 5,421,677 A | | 6/1995 | Adam et al. | 405/270 |
| 5,501,248 A | * | 3/1996 | Kiest, Jr. | 138/123 |
| 5,607,998 A | * | 3/1997 | Markusch et al. | 156/327 |
| 5,639,331 A | | 6/1997 | Payne | 156/242 |
| 5,725,328 A | * | 3/1998 | Schmager | 405/146 |

* cited by examiner

*Primary Examiner*—J. J. Swann
*Assistant Examiner*—Katherine Mitchell
(74) *Attorney, Agent, or Firm*—Joseph C. Gil; John E. Mrozinski, Jr.

(57) ABSTRACT

A surface of a canal, ditch or pipe is lined with a polyurethane/geofabric composite. A non-sagging polyurethane composition is applied to the canal, ditch or pipe surface, a geofabric is contacted with that surface in a manner such that the geofabric becomes impregnated with the non-sagging polyurethane composition which cures to form a polyurethane/geofabric composite. The non-sagging polyurethane is a reaction product of a polyisocyanate, a high molecular weight polyhydroxyl compound and a compound having at least 2 amino groups. A low molecular weight diol or triol, filler and catalyst are optional components. These composites are particularly useful in lining cracked or broken concave or angled surfaces.

16 Claims, No Drawings

PROCESS FOR LINING CANALS, DITCHES AND PIPES WITH A NON-SAGGING POLYURETHANE/GEOFABRIC COMPOSITE

TECHNICAL FIELD OF THE INVENTION

The present invention relates to a process for lining a surface of a canal, ditch or pipe with a polyurethane/geofabric composite (As used herein, the term "geofabric" means a geotextile or a geogrid, or a combination of both). Specifically, the invention relates to a process for applying a non-sagging polyurethane composition to at least one broken, concave and/or angled surface of a ditch, canal and/or pipe and then contacting a geofabric with that surface in a manner such that the geofabric becomes substantially impregnated with the non-sagging polyurethane composition, which cures to form a polyurethane/geofabric composite. The invention further relates to a process for applying a non-sagging polyurethane composition to an overhead surface or a ceiling of a canal and/or pipe and then applying a geofabric in a manner such that the geofabric becomes impregnated with the non-sagging polyurethane composition which cures to form a polyurethane/geofabric composite. The present invention also relates to a ditch, pipe and/or canal lined with a polyurethane/geofabric composite wherein the integrity of the pipe, canal and/or ditch has been maintained with a non-sagging polyurethane/geofabric composite.

BACKGROUND OF THE INVENTION

In recent years, the management of natural resources has become important in many countries throughout the world. Efforts have been directed both toward the conservation of our resources and toward the elimination of pollution from our environment. Particular emphasis has been placed on waste leakage and water loss.

Losses in the distribution of water using unlined irrigation ditches are estimated at a minimum to be 25% and in some situations to be more than 50% depending upon the porosity of the ditch surface and the distance the water is being moved. In most rural areas, ditches are formed by excavating the soil to the desired depth and width. The water moves through the ditch in contact with the exposed natural surface. This can be sand, clay, rocks, etc. and, more commonly, mixtures thereof. The porosity will depend upon the proportions of the different components.

The loss of water in unlined irrigation ditches was at one time considered acceptable only because the supply of water exceeded demand. However, as civilization has developed and world population has increased, more water is required for both greater food production and for markedly increasing non-agriculture uses. In addition to greater domestic uses in sanitation, industry now employs large quantities of water in manufacturing and processing procedures.

This high level of consumption plus the very high cost of developing new water supplies has shifted attention to water conservation. Domestic appliances that use less water have been developed. Also, industry has installed recycling purification systems to reduce water consumption.

Although conservation efforts have reduced water consumption to a degree, water is still in relatively short supply, particularly in recent years with the severe droughts in the United States and other countries. Since the most cost effective conservation opportunities and readily accessible water supplies already have been developed, greater attention must be directed to improving the efficiency of water distribution systems.

Improvements in water distribution have been made. A limited number of ditches and canals have been lined with concrete and/or preformed concrete pipes. Concrete is durable and has a long life when properly used. However, concrete is expensive to place and finish and is damaged by unfavorable temperatures during curing. Also, concrete is subject to frost damage, cracking and heaving which results in leaks.

Processes for forming composite liners for canals and ditches and apparatus to perform such a processes are disclosed, for example, in U.S. Pat. Nos. 4,872,784; 4,955,759; 4,955,760; 5,049,006; 5,062,740; 5,421,677; 5,607,998; and 5,639,331.

U.S. Pat. No. 5,421,677 ("the '677 patent") is directed to an improved process of forming a ditch liner. The process of the '677 patent discloses the use of a mixture comprising one or more polyisocyanates, a polyol mixture, one or more fillers, and a catalyst. The mixture of the '677 patent is dispensed on a geotextile, thereby forming a liquid polyurethane soaked geotextile composite. The liquid polyurethane soaked geotextile composite is then placed over the surface of an area to be lined and allowed to cure, thereby forming a polyurethane/geotextile composite.

Sometimes, however, the surface or surfaces of a pipe, ditch and/or canal to be lined are broken, concave, and/or sloped at an angle equal to or greater than 90°. Additionally, at times, water flow is directed through canals and/or pipes located underneath roadways. The area to be lined for such canals and/or pipes includes the overhead surfaces or ceiling of the canal and/or pipe. It is not feasible to use the composite disclosed in the '677 patent for such elevated surfaces because the disclosed composite is soaked with liquid polyurethane which cannot be applied and adhered to surfaces which are broken, concave, and/or at an angle equal to or greater than 45° relative to the "floor". Nor can the composite as disclosed in the '677 patent be applied and adhered to overhead surfaces.

A non-sagging polyurethane composition would be specifically well suited for lining concave, broken and/or angled surfaces of a ditch, pipe and/or canal, as well as overhead surfaces of ceilings of canals and/or pipes because it can be applied to those surfaces as a bead which can subsequently be spread over substantially the entire surface using, for example, a roller or spatula. A geofabric can then be brought into contact with the applied non-sagging polyurethane composition. The non-sagging polyurethane composition would exhibit excellent adhesion to the surface of a ditch, pipe and/or canal as well as to the geofabric and, upon curing, form a polyurethane/geofabric composite, which would provide a watertight seal with the surface of a ditch, pipe and/or canal.

Various non-sagging polyurethane compositions are known in the art and are described in, for example, in U.S. Pat. Nos. 4,444,976; 4,552,934; 4,698,408; 4,728,710; 4,743,672; 4,954,199; 4,994,540; 5,059,672; 5,164,473; and 5,166,303. These patents disclose two-component polyurethanes basically consisting of a polyisocyanate or polyisocyanate prepolymer component and a curative component containing a polyol and a polyamine.

U.S. Pat. No. 4,444,976 ("the '976 patent") discloses sag-resistant adhesive two-component compositions. These compositions require an isocyanate prepolymer, a low molecular weight polyol containing at least 2–5 hydroxyl groups and a secondary diamine having a molecular weight of up to about 325. The adhesive claimed in the '976 patent exhibits a gel time at 24° C. of at least two minutes. The relatively short gel time of the adhesive disclosed in the '976 patent makes it suitable for outdoor applications where gel times of more than 10 minutes are usually required.

U.S. Pat. No. 5,607,998 ("the '998 patent") also discloses non-sagging polyurethane compositions. These compositions require a liquid polyisocyanate, a liquid isocyanate-reactive mixture which includes one or more hydroxyl group containing compounds, one or more organic compounds containing diamines, polyamines, amine terminated polyethers and mixtures thereof, with at least one of the organic compounds containing at least one aromatic amine group, and one or more low molecular weight diols or triols, and an inorganic filler mixture composed of glass flakes and talc. The addition of talc to glass flakes containing liquid polyurethane raw materials provides homogeneous, phase stable systems. The reaction mixture as described in the '998 patent forms a non-sagging polyurethane composition, which is sandable once it is fully cured. The use of two fillers, one being an extremely abrasive glass filler, is a disadvantage in applications where sandability is not required.

For the foregoing reasons, it would be desirable to form a non-sagging polyurethane/geofabric composite that can be applied over broken, concave and/or angled surfaces of a canal, ditch and/or pipe. It is also desirable to use a non-sagging polyurethane/geofabric composite to line an overhead surface or ceiling of a canal and/or pipe.

None of these desirable features mentioned above can be achieved using the polyurethane composition disclosed in the '677 patent. The polyurethane composition disclosed in the '677 patent is a liquid and as such is not suitable to overcome the problems related to lining surfaces in pipes, ditches and canals which are concave, and/or at an angle of greater than 45° or overhead surfaces.

SUMMARY OF THE INVENTION

It is an object of the present invention to provide a process for lining at least one broken, concave and/or angled surface of a canal, ditch and/or pipe.

It is another object of the present invention to provide a process for lining an overhead surface or ceiling of a canal and/or pipe.

It is also an object of the present invention to provide a ditch, pipe, and/or canal lined with a polyurethane/geofabric composite wherein the integrity of the canal, pipe, and/or ditch has been maintained with a non-sagging polyurethane/geofabric composite.

These and other objects, which will be apparent to those skilled in the art, are accomplished by dispensing a non-sagging polyurethane composition onto a broken, concave and/or angled surface of a ditch, canal and/or pipe, or onto an overhead surface or ceiling of a canal and/or pipe, the non-sagging polyurethane composition comprising a reaction product of: a) a liquid polyisocyanate component; b) 80–98% by weight, based on total weight of b) and c), of a liquid isocyanate reactive component comprising one or more hydroxyl group containing compounds having from about 2 to about 6 hydroxyl groups and a number average molecular weight of from at least 250 to about 8,000, and 0 to 10% by weight, based on total weight of b), of a low molecular weight diol or triol having a hydroxy equivalent weight of from about 31 to 99; c) 2–20% by weight, based on total weight of b) and c), of an isocyanate reactive compound containing at least two amine groups; optionally, d) one or more fillers; and optionally, e) a catalyst and then contacting a geofabric with the non-sagging polyurethane composition before it is cured, and allowing the polyurethane to cure to form a non-sagging polyurethane/-geofabric composite.

DETAILED DESCRIPTION OF THE INVENTION

The invention is directed to a process for lining at least one concave, broken and/or angled surface of a canal, pipe, and/or ditch comprising dispensing a non-sagging polyurethane composition onto a concave, broken, and/or angled surface of a ditch, canal and/or pipe, contacting a geofabric with the non-sagging polyurethane composition and allowing the polyurethane composition to cure. The invention is further directed to a process for lining an overhead surface or ceiling of a canal and/or pipe comprising dispensing a non-sagging polyurethane composition onto an overhead surface or ceiling of a pipe and/or canal, contacting a geofabric with the non-sagging polyurethane composition and allowing the polyurethane composition to cure.

The non-sagging polyurethane composition is the reaction product of a mixture comprising: a) a liquid polyisocyanate component; b) 80%–98% by weight, preferably 90%–98% by weight, most preferably, 94%–97% by weight, based on total weight of b) and c), of a liquid high molecular weight isocyanate reactive component comprising one or more hydroxyl group containing compounds having from about 2 to about 6 hydroxyl groups having a number average molecular weight of from at least 250 to about 8,000, preferably from about 400 to about 4,000, and, optionally, 0–10% by weight, based on total weight of b), of one or more low molecular weight diols or triols having hydroxyl equivalent weights of from about 31 to 99; c) 0–20% by weight, preferably about 2–10% by weight, most preferably about 3–6% by weight, based on total weight of b) and c) of an isocyanate reactive compound containing at least two amine groups, preferably a diamine, polyamine, amine terminated polyether and/or a combination thereof; optionally, d) one or more fillers in an amount of up to 80% by weight based upon the total weight of the polyurethane composition, preferably in an amount of from 20 to 50% by weight; and optionally, e) a catalyst, preferably an organometallic catalyst. It is preferred that the liquid isocyanate reactive component b) and the isocyanate reactive compound containing at least two amino groups c), any filler d) and any catalyst e) be combined with each other prior to mixing with liquid polyisocyanate component a).

As used herein, the terms "ditch" and "canal" are used interchangeably and can refer to any liquid carrying surface having a depression therein or a sloped side.

As used herein, the term "geofabric" refers to a geotextile or a geogrid, and/or a combination of both. "Geotextile" refers to any woven or non-woven porous blanket or mat which is produced from natural or synthetic fibers. "Geogrid" refers to any network of integrally connected polymeric material.

Any of the known geotextiles and geogrids may be used in the practice of the present invention. Examples of geotextiles and geogrids include: woven or non-woven polypropylene, polyester, jute and cotton fabrics.

Any of the known liquid polyisoyanates may be used in the practice of the present invention. Suitable liquid organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Such isocyanates include those represented by the formula Q(NCO)$_n$ in which n represents a number from 2 to about 5, preferably 2 to 3, and Q represents an aliphatic hydrocarbon group containing from 2 to about 18, preferably from 6 to 10, carbon atoms, a cycloaliphatic hydrocarbon group containing from 4 to about 15, preferably from 5 to 10, carbon atoms; an araliphatic hydrocarbon group containing from 8 to 15, preferably from 8 to 13, carbon atoms; or an aromatic hydrocarbon group containing from 6 to about 15, preferably from 6 to 13, carbon atoms. Examples of suitable isocyanates include: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,3,5-trimethyl-isocyanatomethylcyclohexane ("isophorone diisocyanate" (See, e.g. U.S. Pat. No. 3,401,190)); 2,4- and 2,6-hexahydrotoluene diisocyanate and mixtures of these isomers; dicyclohexylmethane-4,4'-diisocyanate ("hydrogenated MDI", or "HMDI"); 2,4- and 2,6-toluene diisocyanate and mixtures of these isomers ("TDI"); diphenylmethane-2,4'- and/or -4,4'-diisocyanate ("MDI"); polymethylene poly(phenylisocyanates) of the kind which may be obtained by condensing aniline with formaldehyde, followed by phosgenation ("crude MDI") which are described, for example, in British Patents 878,430 and 848,671; norbornane diisocyanates (such as described in U.S. Pat. No. 3,492,330); m- and p-isocyanatophenyl sulfonylisocyanates (of the type described in U.S. Pat. No. 3,454,606); perchlorinated aryl polyisocyanates (of the type described, for example, in U.S. Pat. No. 3,227,138); modified polyisocyanates containing carbodiimide groups (of the type described in U.S. Pat. No. 3,152,162); modified polyisocyanates containing urethane groups (of the type described, for example, in U.S. Pat. Nos. 3,394,164 and 3,644,457); modified polyisocyanates containing allophanate groups (of the type described, for example, in British Patent 994,890); modified polyisocyanates containing isocyanurate groups (of the type described, for example, in U.S. Pat. No. 3,002,973, German Patentschriften 1,022,789, 1,222,067 and 1,027,394, and German Offenlegungsschriften 1,919,034 and 2,004,048); modified polyisocyanates containing urea groups (of the type described in German Patentschrift 1,230,778); polyisocyanates containing biuret groups (of the type described, for example, in U.S. Pat. Nos. 3,124,605 and 3,201,372, and in British Patent 889,050); polyisocyanates obtained by telomerization reactions (of the type described, for example, in U.S. Pat. No. 3,654,106); polyisocyanates containing ester groups (of the type described, for example, in British Patents 965,474 and 1,072,956, and in U.S. Pat. No. 3,567,763); reaction products of the above-mentioned isocyanates with acetals (as described in German Patentschrift 1,072,385); and polyisocyanates containing polymeric fatty acid groups (of the type described in U.S. Pat. No. 3,455,883). It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use readily available polyisocyanates, such as 2,4- and 2,6-toluene diisocyanates and their isomer mixtures ("TDI"); diphenyl methane diisocyanate ("MDI"); polymethylene poly(phenylisocyanates) of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates"). The commercially available phosgenation products of aniline/formaldehyde condensates are the most preferred isocyanates to be used in the present invention.

In general, aliphatic and cycloaliphatic isocyanates are less desirable for use in the instant invention.

Preferred polyisocyanates are liquid polyisocyanates having isocyanate group contents of from about 10 to 50% by weight, preferably from 30 to 35%, most preferably from 30 to 33% by weight. It is generally preferred that the isocyanates used have a viscosity of less than 15,000 mPa·s at 25° C.

It is also preferred that the isocyanate used be non-volatile at ambient temperature. The presently most preferred isocyanates are polymethylene poly(phenylisocyanates) having NCO contents of from 15 to 33.5% by weight, preferably 30 to 33% by weight, and viscosities of from 20 to 3,000 mPa·s at 25° C., and liquid adducts of such isocyanates which have been made with polyols.

Suitable polyols useful as the liquid high molecular weight polyisocyanate reactive component of the present invention include those organic compounds having number average molecular weights of from 250 to 8,000, preferably from about 400 to about 4,000, and containing from 2 to 6 hydroxyl groups. These compounds include, for example, polyethers, polyesters, polythioethers, polyacetals, and polycarbonates of the type known for the production of polyurethanes. Preferred compounds include one or more polyether polyols containing from 2 to 6 isocyanate-reactive groups and having molecular weights of from 400 to 4,000.

Examples of suitable polyether polyols include polyethers prepared, for example, by the polymerization of epoxides such as ethylene oxide, propylene oxide, butylene oxide, tetrahydrofuran, styrene oxide, and epichlorohydrin, optionally in the presence of Lewis acids such as BF$_3$, or prepared by chemical addition of such epoxides, optionally added as mixtures or in sequence, to starting components containing reactive hydrogen atoms, such as water, alcohols, or amines. Examples of suitable starting components include ethylene glycol, 1,3- or 1,2-propanediol, 1,2-, 1,3-/or 1,4-butanediol, trimethylolpropane, 4,4'-dihydroxydiphenylpropane, aniline, ammonia, ethanolamine, and ethylene diamine. Sucrose polyethers of the type described, for example, in German Auslegeschriften 1,176,358 and 1,064,938, may also be used according to the invention. Polyethers which contain predominantly primary hydroxyl groups (up to about 90% by weight, based on all of the hydroxyl groups in the polyether) are also suitable. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent No. 1,152,536) are also suitable, as are polybutadienes containing hydroxyl groups. Particularly preferred polyether polyols include polyoxyalkylene polyether polyols, such as polyoxypropylene diol, polyoxybutylene diol, and polytetramethylene diol, as well as polyoxypropylene polyoxyethylene diols and triols.

Further examples of suitable polyether polyols include the so-called "PHD polyols," which are prepared by reaction of an organic polyisocyanate, hydrazine, and a polyether polyol. Such polyols are disclosed in U.S. Pat. No. 3,325,421, which describes a method for producing PHD polyols by reacting a stoichiometric or substoichiometric quantity (relative to diamine) of polyisocyanate dissolved in a polyol having a molecular weight of at least 500 and a hydroxyl number of no more than 225. See also U.S. Pat. Nos. 4,042,537 and 4,089,835, the texts of which are incorporated herein by reference.

Additional examples of polyether polyols suitable for use as the liquid high molecular weight polyisocyanate reactive component include the so-called "polymer polyols," which are prepared by polymerizing styrene and acrylonitrile in the presence of a polyether. See, for example, U.S. Pat. Nos. 3,383,351; 3,304,273; 3,523,093; 3,652,639; 3,823,201 and 4,390,645, the texts of which are incorporated herein by reference.

The most preferred polyethers are polyoxypropylene polyethers that do not contain ethylene oxide units.

Optionally, one or more organic low molecular weight diols or triols can be used as part of the isocyanate reactive compound. Suitable organic diols or triols according to the invention include, for example, diols and triols having equivalent weights of about 31 to 99 and a molecular weight of less than 250 (number average). These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, and 2,2,4-trimethylpentane-1,3-diol. Preferred diols and triols include, for example, dipropyleneglycol and tripropylene glycol.

Suitable amine compounds useful as the liquid isocyanate reactive component c) include, for example, aliphatic, cycloaliphatic or aromatic diamines or triamines. Preferred diamines and triamines have a molecular weight in the range of from about 62 to 400. Although substantially any isocyanate-reactive diamine or triamine can be used in the practice of the present invention, the preferred isocyanate-reactive amines are aliphatic, cycloaliphatic, or aromatic diamines having only primary amino groups. Particularly preferred diamines are aliphatic or cycloaliphatic diamines such as ethylene diamine, hexamethylenediamine, bis(4-aminocyclohexyl)methane, and 1-amino-3,3,5-trimethyl-5-aminomethylcyclohexane ("IPDA"). A most preferred diamine is bis(4-aminocyclohexyl)methane.

Aromatic diamines are also useful as the liquid isocyanate reactive component c). Typical aromatic diamines have molecular weights of from about 108 to about 400 and preferably contain exclusively aromatically bound primary or secondary (preferably primary) amino groups. The aromatic diamines preferably have alkyl substituents in at least one position ortho to the amino groups. In particular, such aromatic diamines preferably have at least one $C_1$–$C_3$ alkyl substituent located ortho to one of the amino groups and two $C_1$–$C_3$ alkyl substituents located ortho to the other amino group, especially with an ethyl, propyl, and/or isopropyl substituent in at least one such ortho position and methyl substituents optionally present in the other ortho positions. Mixtures of such aromatic diamines are, of course, also suitable. Suitable aromatic diamines include: 2,4-diaminomesitylene, 1,3,5-triethyl-2,4-diaminobenzene, 1,3,5-triisopropyl-2,4-diaminobenzene, 1-methyl-3,5-diethyl-2,4-diaminomesitylene, 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, and 3,5-diethyl-3',5'-diisopropyl-4,4'-diaminodiphenylmethane. Other suitable but less preferred aromatic diamines include: 1,4-diaminobenzene, 2,4-diaminotoluene, 2,4'- or 4,4'-diaminodiphenylmethane, 3,3'-dimethyl-4,4'-diaminodiphenylmethane, 4,4'-diaminodiphenyl propane-(2,2), t-butyl toluene diamine, 1-methyl-3,5-bis-(methylthio)-2,4- or -2,6-diaminobenzene, and mixtures of such diamines. Particularly preferred aromatic diamines include: 1-methyl-3,5-diethyl-2,4-diaminobenzene, either alone or as a mixture with 1-methyl-3,5-diethyl-2,6-diaminobenzene.

Suitable but much less preferred isocyanate-reactive amines useful as component c) contain both hydroxyl and amino groups. Mixtures of such compounds with the compounds mentioned above are, of course, also suitable.

Other amine compounds suitable for use as liquid isocyanate reactive component c) include polyethers terminated with aromatic amino groups, the so-called amine terminated polyethers containing aromatically bound primary or secondary (preferably primary) amino groups. Compounds containing amino end groups can also be attached to the polyether chain through urethane, ester, or ether groups. These aromatic amine terminated polyethers can be prepared by any of the methods known in the art.

In one method for preparing aromatic amine terminated polyethers, relatively high molecular weight polyether polyols of the type suitable for use in component b) in the process of the present invention may be converted into an amine terminated polyether. Methods for making polyethers containing aromatic amino end groups are disclosed in U.S. Pat. Nos. 3,808,250, 3,975,428, and 4,016,143. Relatively high molecular weight compounds containing amino end groups may also be obtained according to U.S. Pat. No. 3,865,791 by reacting isocyanate prepolymers based on polyhydroxyl polyethers with hydroxyl-containing enamines, aldimines, or ketimines and hydrolyzing the reaction product.

Preferred aromatic amine terminated polyethers include aminopolyethers obtained by the hydrolysis of compounds containing isocyanate end groups. For example, in a process disclosed in German Offenlegungsschrift 2,948,419, polyethers containing hydroxyl groups (preferably two or three hydroxyl groups) are reacted with polyisocyanates to form isocyanate prepolymers whose isocyanate groups are then hydrolyzed in a second step to form amino groups. Particularly preferred amine terminated polyethers are prepared by hydrolyzing an aromatic isocyanate compound having an isocyanate group content of from 0.5 to 40% by weight. The most preferred of such polyethers are prepared by first reacting a polyether containing two to four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218; 4,454,730; 4,472,568; 4,501,873; 4,515,923; 4,525,534; 4,540,720; 4,578,500; and 4,565,645, all of the disclosures of which are herein incorporated by reference. Similar products are also described in U.S. Pat. Nos. 4,506,039; 4,525,590; 4,532,266; 4,532,317; 4,723,032; 4,724,252; and 4,855,504.

Other suitable amine terminated polyethers include aminophenoxy-substituted polyethers described, for example, in European published applications 0288825 and 0268849.

Diamines, polyamines, and amine-terminated polyethers can be used alone or combination. It is preferred to combine these amines with the other isocyanate reactive compounds prior to mixing them with the isocyanate.

Optionally, fillers can be included in polyurethane compositions useful in the practice of the present invention. The fillers useful herein are known. Useful fillers include calcium carbonate, barium sulfate, kieselguhr, whiting, mica, glass fibers, liquid crystal fibers, glass flakes, glass balls, aramide fibers, and carbon fibers. In addition, ground solid plastics (such as polyurethane scrap) and rubber wastes (such as from tires) of substantially any kind may also be used. Ground rubber is the presently preferred filler.

A catalyst may be included in the reaction mixture used to produce the polyurethane compositions useful in the practice of the present invention in an amount of from about 0.0001% to about 1% by weight, preferably from 0.0001% to about 0.1% by weight, based on the total weight of the liquid isocyanate reactive component. Catalysts which may be used in the present invention include, for example, various organometallic compounds, such as tin(II) salts of carboxylic acids, dialkyl tin salts of carboxylic acids, dialkyl tin mercaptides, and dialkyl tin dithioesters. Of course, it is also possible to use any of the catalysts which are known to those skilled in the art of polyurethane chemistry. It is preferred to use organo-metallic compounds as the catalysts in the present invention.

The polyurethane composition used in the present invention is produced at an isocyanate index of from about 140 to 90, preferably from about 110 to 100. By the term "Isocyanate Index" (also commonly referred to as NCO index), is meant as the number of equivalents of isocyanate, divided by the total number of equivalents of isocyanate-reactive hydrogen containing materials, multiplied by 100(NCO/(OH+NH)×100).

The materials used to produce the polyurethane compositions useful in the present invention may be mixed in any way, e.g., by stirring them, by combining them in a mixhead, or the like. In field lining and/or repairing, however, it is possible to store the polyurethane-forming materials using a cartridge with a membrane separating the two components and a plunger to break the membrane prior to application of the composition. Another simple method is to store premeasured amounts of those materials in separate containers for transporting the materials from which the polyurethane composition is to be formed to a desired location, e.g., in separate plastic bags and, when ready to use, combine them in one container (e.g., a single plastic bag) and mix by kneading. After mixing is complete, the material can be applied by any technique, e.g., squeezing it out of a hole made by cutting off a corner of the plastic bag in which the materials were combined.

In another method for using the polyurethane composition in accordance with the present invention, the polyurethane-forming materials are stored in separate cartridges until the polyurethane composition is to be applied and then applied using a two component caulking gun to apply the polyurethane composition to the desired surface. The mixing in this case is achieved by a static mixer located in the tip of the caulking gun.

The most preferred way of preparing the non-sagging polyurethane composition of the present invention is to use a two-component mixing/metering machine.

The non-sagging polyurethane composition of the present invention has a working time (i.e., period during which it may be successfully applied) of from about 5 to 60 minutes, preferably about 10 to 30 minutes, during which the non-sagging polyurethane composition may be applied. Once the non-sagging polyurethane composition is applied and the geofabric is contacted with the still uncured non-sagging polyurethane composition, final cure occurs in about 2 to 24 hours at ambient temperature, preferably from about 2 to 6 hours at ambient temperature. The cure time may, of course, be accelerated by any of the techniques known to those skilled in the art.

The geofabric may be brought into contact with the uncured polyurethane composition by any of the application techniques known to those in the art which ensure at least partial penetration of the geofabric by the polyurethane. If the geofabric is to be applied to a relatively small surface area, it is advantageous to pre-cut the geofabric to the desired size prior to contacting it with the uncured polyurethane.

The invention is further illustrated but is not intended to be limited by the following examples in which all parts and percentages are by weight, unless otherwise specified.

EXAMPLE

| | |
|---|---|
| Isocyanate A: | polymethylene poly (phenylisocyanate) having an NCO content of about 31.5%, a functionality of 2.6 and a viscosity at 25° C. of 200 mPa · s. |
| Polyol 1: | a monoethanolamine-started propylene oxide polyether polyol, having an OH number of about 350, a functionality of about 3 and a number average molecular weight of about 481. |
| Polyol 2: | a glycerine-started propylene oxide polyether polyol, having an OH number of about 250, a functionality of about 3 and a number average molecular weight of about 670. |
| Polyol 3: | a propylene glycol-started propylene oxide polyether polyol, having an OH number of 56, a functionality of about 2 and a molecular weight of about 2,000. |
| Amine 1: | bis(4-aminocyclohexyl)methane |
| Catalyst A: | dimethyltin dilaurate, commercially available as Fomrez UL-28 from Witco. |
| Geotextile A: | Typar-3301, spunbonded polypropylene, 3 oz/yd$^2$, 12 mils thickness (Reemay) |
| Geogrid A: | Fornit 20, interlocked polypropylene yarn, 4.5 oz/yd$^2$, 0.6 in. aperture size (Huesker) |

The following polyol blend was used in the Example:

| | |
|---|---|
| Polyol Blend A | 10 pbw Polyol 1 |
| | 43 pbw Polyol 2 |
| | 43 pbw Polyol 3 |
| | 0.01 pbw Catalyst A |

96 g Polyol Blend A and 4 g Amine 1 were thoroughly mixed in a ½ gallon ZIPLOCK bag, before 46.4 g of Isocyanate A were added. Upon addition of Isocyanate A, the viscosity of the mixture in the bag increased significantly and the reaction mixture was kneaded in the bag for at least 2 min. to achieve thorough mixing. A corner of the bag was then cut off and the non-sagging polyurethane composition was squeezed out as a bead onto a polyethylene sheet. The non-sagging polyurethane composition was spread out with a spatula and Geotextile A was then placed on top of the uncured non-sagging polyurethane composition. A rubber roller was then used to evenly distribute the non-sagging polyurethane composition and to ensure that the non-sagging polyurethane composition penetrated Geotextile A to form a polyurethane/geofabric composite after curing. The composite sample was removed from the polyethylene sheet and physical properties of the composite were determined. Those properties are reported in Table 1.

TABLE 1

|  | Example 1 |
| --- | --- |
| Polyol Blend A (grams) | 96 |
| Isocyanate A (grams) | 46.4 |
| Amine 1 (grams) | 4 |
| Index (NCO/OH × 100) | 105 |
| Geotextile | A |
| Tensile Strength (psi) | 997 |
| Elongation (%) | 38.1 |
| Split Tear (pli) | 146.2 |
| Die "C" Tear | 258 |

Before applying Geotextile A, Geogrid A can be applied over the non-sagging polyurethane composition.

The non-sagging polyurethane is preferably produced via a two-component mixing/metering machine, which ensures an accurate NCO:OH ratio using a mixhead or static mixer and provides the volume output desirable in actual field applications.

The non-sagging characteristics of the non-sagging polyurethane composition allow application of the non-sagging polyurethane composition and the geotextile or geogrid and/or combination of both, even on overhead surfaces, without experiencing any run-off, to form a polyurethane/geofabric composite, which, after curing, substantially adheres to a surface of a ditch, pipe and/or canal.

The non-sagging polyurethane composition was used in a variety of applications related to the installation of a polyurethane/geofabric composite in canals, pipes and/or ditches having surfaces such as wood, metal and/or concrete. The polyurethane/geofabric composite showed excellent adhesion to those surfaces and formed watertight seals.

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A process for lining a ditch, canal, or pipe comprising applying a non-sagging polyurethane composition onto a surface of the ditch, canal or pipe, then contacting a geofabric with the non-sagging polyurethane composition in a manner such that the geofabric becomes impregnated with the non-sagging polyurethane composition, and allowing the polyurethane to cure and thereby form a polyurethane/geofabric composite, the non-sagging polyurethane composition comprising a reaction product of:

a) a liquid polyisocyanate component;

b) 80–98% by weight, based on total weight of b) and c) of a liquid high molecular weight isocyanate reactive component comprising one or more hydroxyl group containing compounds having from about 2 to about 6 hydroxyl groups and a number average molecular weight of at least 250 and, 0–10% by weight, based on total weight of b), of a low molecular weight diol or triol having a hydroxy equivalent weight of from about 31 to 99;

c) 2–20% by weight, based on total weight of b) and c), of an isocyanate reactive compound containing at least two amine groups;

optionally, d) one or more fillers in an amount of up to 80% by weight, based upon the total weight of the polyurethane composition; and optionally, e) a catalyst.

2. The process of claim 1, wherein the high molecular weight hydroxyl group containing compound of the liquid isocyanate reactive component b) has a number average molecular weight of from about 400 to about 4,000.

3. The process of claim 1, wherein an organo-metallic catalyst is used as catalyst e).

4. The process of claim 1, wherein the isocyanate reactive compound c) has at least two aromatic amine groups.

5. The process of claim 1, wherein the isocyanate reactive compound c) has at least two alicyclic amine groups.

6. The process of claim 1, wherein the isocyanate reactive compound c) is selected from the group consisting of diamines, polyamines, amine terminated polyethers or combinations thereof.

7. The process of claim 1, wherein the liquid polyisocyanate component a) is polymethylene poly (phenylisocyanate).

8. The process of claim 1, wherein the high molecular weight hydroxyl group containing compound of the liquid isocyanate reactive component b) is a polyether.

9. The process of claim 8, wherein the polyether has no ethylene oxide units.

10. The process of claim 1, wherein the non-sagging polyurethane composition is produced at an isocyanate index of from 140 to 90.

11. The process of claim 1, wherein the non-sagging polyurethane composition is produced at an isocyanate index of from 110 to 100.

12. The process of claim 1, wherein the liquid isocyanate reactive component b) and the isocyanate reactive compound c) are used in a ratio of 90:10 to 98:2.

13. The process of claim 1, wherein the surface to which the non-sagging polyurethane composition is applied has a surface angle relative to the longitudinal axis of the pipe, ditch or canal of equal to or greater than 90°.

14. The process of claim 1, wherein the surface to which the non-sagging polyurethane composition is applied is concave.

15. The process of claim 1, wherein the surface to which the non-sagging polyurethane composition is applied is an overhead surface or ceiling.

16. The process of claim 1, wherein the surface to which the non-sagging polyurethane composition is applied is cracked or broken concrete.

* * * * *